Aug. 10, 1937. C. B. FERREE 2,089,829
HEAT TREATING FURNACE
Filed Nov. 21, 1936 3 Sheets-Sheet 1
Fig. I.
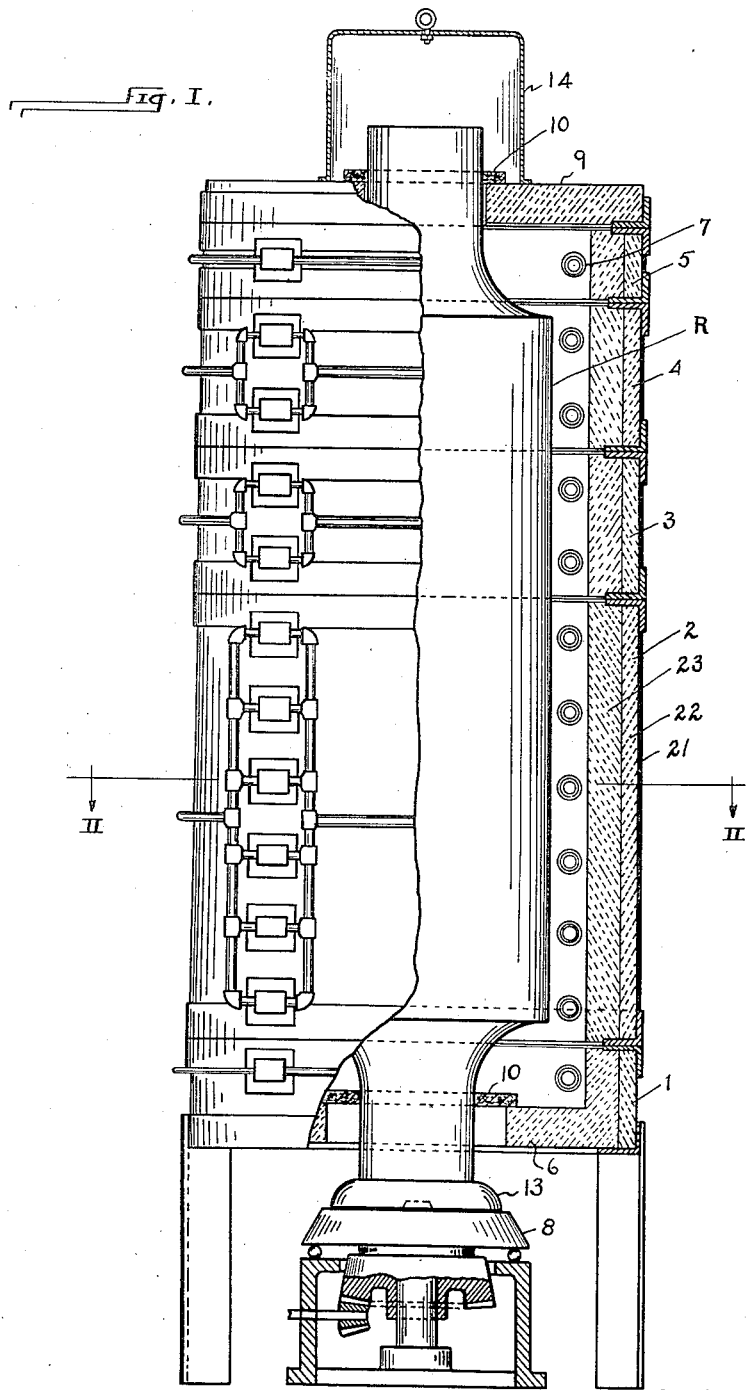
INVENTOR
Clifford B. Ferree
BY
Christy and Wharton
his ATTORNEYS Aug. 10, 1937. C. B. FERREE 2,089,829
HEAT TREATING FURNACE
Filed Nov. 21, 1936  3 Sheets-Sheet 2
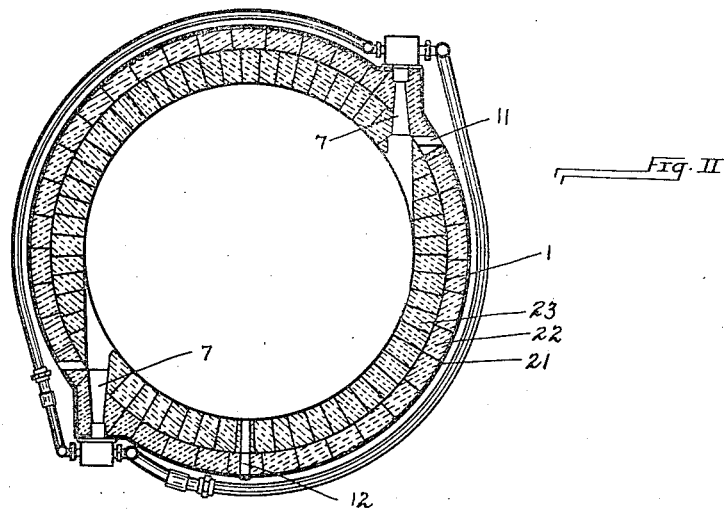
Fig. II
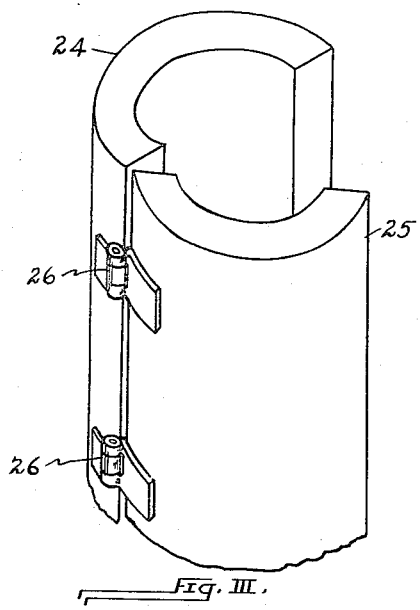
Fig. III.
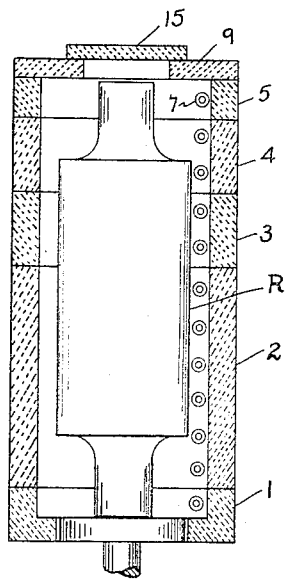
Fig. IV.
INVENTOR
Clifford B. Ferree
BY
Christy and Wharton
his ATTORNEYS Aug. 10, 1937.  C. B. FERREE  2,089,829
HEAT TREATING FURNACE
Filed Nov. 21, 1936   3 Sheets-Sheet 3
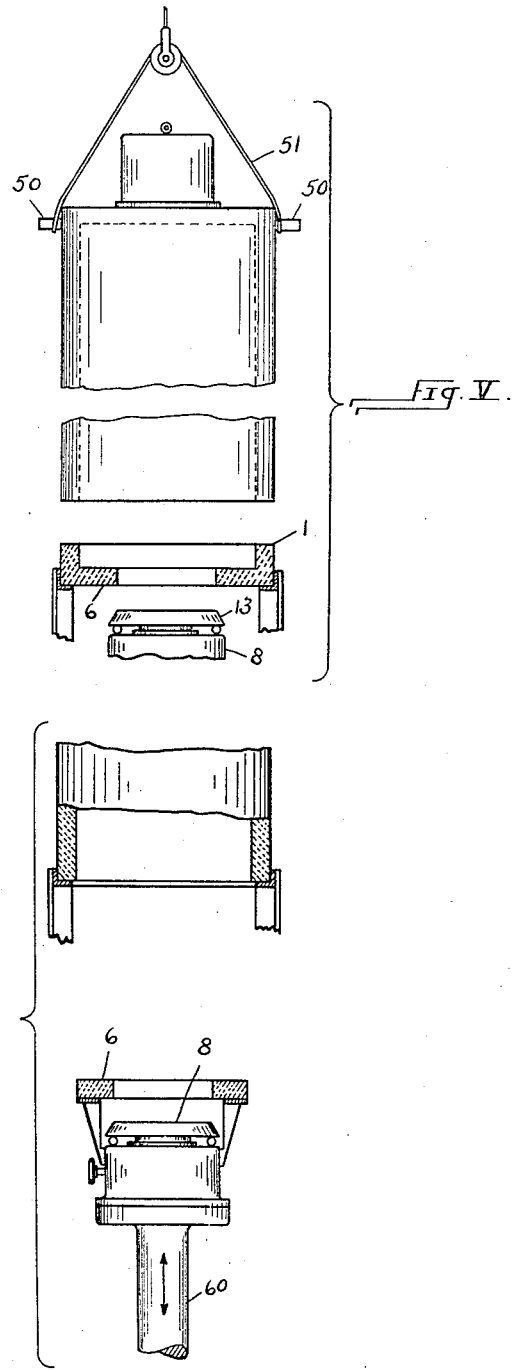
INVENTOR
Clifford B. Ferree
BY
Christy and Wharton
his ATTORNEYS Patented Aug. 10, 1937

2,089,829

UNITED STATES PATENT OFFICE 2,089,829

HEAT TREATING FURNACE

Clifford B. Ferree, Pittsburgh, Pa.

Application November 21, 1936, Serial No. 112,057

1 Claim. (Cl. 266—5)

This invention relates to the heat-treatment of steel articles, and consists in a furnace suitable for the heat-treatment and, more specifically, for the hardening of rolls, and in a method of operation. The invention has been developed for the treatment of forged rolls but it will be manifest that it is applicable to the treatment of rolls in whatever manner produced. The objects of the invention are economy in production and superiority of product.

In the accompanying drawings Fig. I is a view, partly in vertical section, partly in side elevation, of a furnace of the invention; Fig. II is a view of the furnace in horizontal section, on the plane indicated by the line II—II, Fig. I; Fig. III is a fragmentary view in perspective, illustrating a modification in structure; Fig. IV is a view in section illustrating an adaptability of structure; and Figs. V and VI are fragmentary views, partly in side elevation and partly in vertical section, illustrating each another adaptability of structure.

The furnace is of general cylindrical shape, corresponding to that of the article to be treated; and, in the ordinary operations of a roll-producing plant, a plurality of furnaces will be provided of different diametrical sizes, and adapted most economically to treat an output of widely ranging variety in size. Furthermore, the cylindrical furnace walls will advantageously be of sectional formation, and in successive operations the furnace may be composed of a greater or less number of annuli, to the end that for each particular operation the furnace may be accommodated to the length of the roll to be treated. The cylindrical furnace stands in vertical position and the roll arranged for treatment within the furnace stands with its axis coincident with the furnace axis.

In addition to the cylindrical side walls of the furnace there are circular end walls that define the furnace chamber above and below. These end walls are centrally apertured for the extension through of the necks of a roll in place within the furnace. The lower end wall is conveniently made integral with the side walls of the lowermost cylindrical section; the upper is formed of a plurality of parts—preferably of two parts, each of semi-circular extent, meeting on a diametrical line. Co-operating with the furnace walls is a turn-table, on which the roll stands when in position for furnace treatment.

Referring to the drawings, the sections that make up the cylindrical wall of the furnace are indicated at 1, 2, 3, etc. It is convenient to form the lower end wall 6 integrally with the side wall, and, accordingly, the lowermost section 1 of the furnace is conveniently made of minimum longitudinal extent. In the case illustrated, of a furnace of an interior diameter of 42 inches, and a wall consisting of a lining of brick 7 inches thick within a steel shell, this lowermost section is 13¼ inches long. The end wall itself is 5 inches thick within a quarter-inch plate of steel, and, accordingly, the interior length (or height) of this lowermost furnace section is 8 inches. The next superior section, the section 2, is of longitudinal extent sufficient, when assembled with section 1, to receive for treatment a roll of minimum length, and the sections 3, 4, etc. are of such length as to constitute proper increments, adapting the furnace to receive rolls of various greater lengths. In this instance, the section 2 is 4 feet 7½ inches long, the succeeding sections 3 and 4 are each 18½ inches long, and section 5 is 9¼ inches long.

These furnace wall sections are formed of refractory and highly insulating material carried in suitable shells of steel. The insulating material preferably employed is that brick formed by mixing suitable insulating refractory material with sawdust or the like and then shaping and firing. In the firing the sawdust is consumed, and a coherent, porous, light, highly refractory and highly insulating, brick is produced. In this instance, within the shell 21 formed of quarter-inch steel plate, is a lining 22 of massive insulating brick 2½ inches thick, and then an inner lining 23, of the porous insulating fire-brick specified, 4½ inches thick.

At suitable intervals in the vertical extent of the furnace—in this instance at intervals of 9¼ inches—tangential openings 7 are formed through the furnace walls. The number and the circumferential spacing of these openings may be varied. Advantageously at each level two openings are provided, at diametrically opposite points, and advantageously the openings at successive levels are in vertical alignment. In these openings burners are set that project their flames tangentially and immediately within the cylindrical wall surface.

The turn-table 8 is adapted to support a roll to be treated, standing on end upon it, and adequate means are provided to rotate the table with its burden upon it. The cylindrical furnace walls stand in concentric assembly with the turntable and at proper vertical spacing to surround the body of a roll standing in position upon the turn-table.

The upper end wall 9 of the furnace is made in removable and replaceable sections, to the end that when it is removed a roll may be lowered vertically to and raised from position within the cylindrical walls and upon the turn-table; and that when a roll has been lowered to position the end wall may be applied, closing the furnace chamber above. In the assembly the roll R stands in position within the furnace, as shown in Fig. I, its body wholly surrounded and enclosed by the furnace walls and its necks extending above and below through the openings in the end walls. Rings 10 of asbestos applied to the furnace necks rest upon the end walls and complete the closure of the furnace chamber above and below.

It will be understood that the hardening operation that is accomplished is performed on the body of the roll but not upon the necks. The unhardened condition is purposely maintained in the necks of the roll; and it is in accord with this purpose that the necks extend through the end walls and are not enclosed within the furnace chamber.

The closure of the furnace chamber constructed as described with a roll assembled in described manner within, is sufficiently complete that the products of combustion generated within the furnace chamber build up a super-atmospheric pressure and exclude atmospheric air. The closure, however, is not so tight but that at slightly elevated pressure within the gases find exit at the seams.

The burners set in the openings are advantageously adapted to project at one stage in furnace operation relatively large volumes and at another stage relatively small volumes of fuel. The fuel is a gaseous mixture, accurately proportioned for perfect combustion and the pressures are so controlled that combustion is completed within a short distance from emergence into the furnace chamber and in immediate proximity to the inner surface of the furnace wall. Small orifices 11 and 12 through the furnace walls are provided for the lighting of the burners and the introduction of thermocouples, and a similar small peep-hole may be formed in the upper end wall. These all are of small size, and do not disturb furnace operation.

The roll that is to be hardened is a roll that has already been annealed and machined and but for polishing brought to finished shape. In the machining operation the roll will have been cut square at the end and the end surface will be an accurate plane. If in a particular case the neck of the roll has been machined to a relatively small diameter, a terminal portion 13 of larger diameter may be left, to afford a bearing surface of sufficient extent to insure security of position on the turn-table. This portion of larger diameter may ultimately be removed or cut down.

When the machined roll is ready to be hardened, the asbestos rings 10 are applied to its necks, it is raised and swung to vertical position and lowered vertically into a furnace of the invention that stands ready to receive it. When it has been lowered and rests upon the turn-table 8, the lowering apparatus is removed, and the roll is left standing free upon the table. The upper end wall 9 of the furnace is then closed, with the asbestos rings 10 resting upon the end walls. A hood or "can" of sheet steel may then be applied, covering the protruding upper neck of the roll and resting upon the end wall. This hood protects furnace operation from disturbance by accidental draughts, and has effect also in conserving heat.

When all has thus been made ready the turn-table is set in rotation, carrying the roll with it, and the burners are lit. The burners deliver at first their minimum flame and as the temperature of furnace and its contents increases the volume of flame increases, until at length the roll is brought to peak temperature. At that temperature with diminution of flame the roll may be maintained for the desired interval of time. At the end of that time the flame is shut off; the turn-table is arrested; the upper end wall of the furnace is removed; the roll is re-engaged by conveying apparatus, and is raised from the furnace and carried to cooling apparatus, such as that described in Letters Patent of the United States No. 2,044,384, granted me June 16, 1936, or its equivalent. The asbestos rings may adhere to the roll when it is carried from the furnace, but they may readily be stripped away.

I have found it advantageous to rotate the roll within the furnace in the same direction as that in which the flames from the burners are projected.

A permissible modification of structure is illustrated in Fig. III. The cylindrical furnace walls are formed of two semi-cylindrical parts, 24 and 25, hinged together, as indicated at 26, and capable of being opened to receive a roll introduced laterally and closed to form a continuous wall. Instead of raising and lowering the roll, it manifestly is entirely possible to raise and lower the cylindrical furnace walls or the turn-table, or both, and to shift the roll horizontally in order to bring it to and to remove it from position for heat treatment. For example, the side and top walls of the furnace may be made integral, as shown in Fig. V, and provided with lugs 50 adapted to be engaged by the fall 51 of an overhead crane. In such way the upper body of the furnace may be moved to and from normal position of assembly with the floor 6 in order to permit the roll to be brought to and removed from position for heat treatment. Again, as shown in Fig. VI, the side and top walls of the furnace may be supported in stationary position, with the floor 6 and turn-table 8 borne by the upper end of a plunger 60 of a vertical hydraulic ram or power-jack (not shown). In service the plunger 60 will be lowered a sufficient interval below the stationary furnace walls to permit the roll under treatment to be positioned vertically on the turn-table 8. Then, the plunger will be elevated, raising the roll to desired position within the furnace, and bringing the floor 6 of the furnace into proper place at the bottom of the furnace side walls.

The furnace diameter is such with relation to that of the body of the roll received for treatment within it that the flames that are jetted through the openings 7 do not play upon the roll surface. The combustible mixture is such that combustion is completed within a short distance of the opening into the furnace chamber. The hot products of combustion, however, under the impulsion of the in-jetted flames, swirl through the annular space between furnace wall and roll surface; and by this swirling stream the surface of the rotating roll is swept. Within the furnace of 42-inch interior diameter I have treated with success rolls that ranged in diameter from 12 to 24 inches; and within a like furnace of 54-inch diameter I have treated rolls that ranged from 20 to 28 inches.

In operation the body of the vertically standing and rotating roll is enveloped in a vortex of hot gases. Heat dissipation outwardly through the furnace walls is reduced to a minimum, and heat from the swirling gaseous blanket is absorbed at maximum rate by the metal of the roll. The peak temperature to which the roll must be brought in this hardening operation is, typically, 1525° F.

In the usual practice two furnaces are provided to bring the roll to and maintain it for the desired time at the peak. The first furnace is called the "pre-heat" furnace, and the operation of bringing the roll to peak temperature within it is called the "pre-heat." When this temperature has been attained the roll is removed from the pre-heat furnace and carried and introduced in a second "hardening" furnace, where it continues for the desired time interval at the desired temperature, until at length it is taken out again and quenched in streams of water to accomplish the desired hardening. I conduct the whole heat-treatment in the single furnace described, and it is manifest that, so proceeding, I effect great saving over the prior operation both in heat and power consumption, and manifestly avoid the undesired disturbance of the heat conditions of the roll that is incident to transfer from one furnace to another. In the operation of my furnace heat is available, that the roll may take up heat at optimum rate; the heat cycle is under perfect control; in consequence a high and uniform standard of quality may be maintained. After the completion of the heat treatment and the removal of a roll, the emptied furnace because of its structure cools with relatively great rapidity. In the ordinary operation because of the slowness of cooling of the pre-heat furnace after a roll has been heated and removed the furnace will not be in condition to receive another roll until about 16 hours have elapsed. The furnace of my invention cools in the course of 5 or 6 hours to a temperature permissive of the introduction of a fresh roll.

It sometimes is desirable that not the body only but the necks of the roll as well be hardened. In such case the furnace will be made ready by lowering the cylindrical side-walls until the plane of their lower edge is coincident with or lower than the plane of the surface of the turn-table; by building up the sectional side-walls to a height exceeding the over-all length of the roll; and by closing (as by a tile 15) the orifice in the upper end wall of the furnace when the roll is in place within. This arrangement is illustrated in Fig. IV and will be understood without further description.

I claim as my invention:

In a roll-hardening furnace the combination of a turn-table with horizontal top, adapted to sustain and rotate a roll standing in vertical position concentrically upon it, a single cylindrical chamber wall adapted to surround the barrel of a roll so positioned upon the turn-table and to form around the barrel of the roll an annular space, free and unobstructed throughout the extent of the barrel, and a plurality of burner openings arranged at successive elevations in the vertical extent of the wall and opening tangentially through the wall.

CLIFFORD B. FERREE.